United States Patent
Kennedy

(10) Patent No.: US 9,851,984 B2
(45) Date of Patent: Dec. 26, 2017

(54) METHODS, APPARATUS AND ARTICLES OF MANUFACTURE TO UPDATE VIRTUAL MACHINE TEMPLATES

(75) Inventor: Paul Kennedy, San Mateo, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 901 days.

(21) Appl. No.: 13/696,384

(22) PCT Filed: May 12, 2010

(86) PCT No.: PCT/US2010/034574
§ 371 (c)(1),
(2), (4) Date: Nov. 6, 2012

(87) PCT Pub. No.: WO2011/142753
PCT Pub. Date: Nov. 17, 2011

(65) Prior Publication Data
US 2013/0074072 A1    Mar. 21, 2013

(51) Int. Cl.
*G06F 9/46* (2006.01)
*G06F 9/445* (2006.01)
*G06F 9/455* (2006.01)

(52) U.S. Cl.
CPC ...... *G06F 9/44505* (2013.01); *G06F 9/45558* (2013.01); *G06F 2009/45562* (2013.01)

(58) Field of Classification Search
CPC ............. G06F 9/45533; G06F 9/44505; G06F 9/45558; G06F 2009/45562
See application file for complete search history.

(56) References Cited

U.S. PATENT DOCUMENTS

| | | | |
|---|---|---|---|
| 6,658,426 B1 | 12/2003 | Poskanzer | |
| 7,124,289 B1 | 10/2006 | Suorsa | |
| 7,131,123 B2 | 10/2006 | Suorsa et al. | |
| 7,152,109 B2 | 12/2006 | Suorsa et al. | |
| 8,214,878 B1* | 7/2012 | Hernacki et al. | 726/1 |
| 9,015,824 B1* | 4/2015 | Drewry | H04L 9/32 726/15 |
| 2005/0257206 A1 | 11/2005 | Semerdzhiev | |

(Continued)

FOREIGN PATENT DOCUMENTS

| | | |
|---|---|---|
| CN | 101216777 A | 7/2008 |
| WO | WO-0239257 A2 | 5/2002 |

OTHER PUBLICATIONS

European Patent Office, Extended European Search Report, dated Feb. 6, 2014, 6 pgs.

(Continued)

*Primary Examiner* — Camquy Truong
(74) *Attorney, Agent, or Firm* — Hewlett Packard Enterprise Patent Department

(57) ABSTRACT

Example methods, apparatus and articles of manufacture to update virtual machine templates are disclosed. A disclosed example method to update a virtual machine template (105) includes updating a management policy (110), starting a virtual machine (116) based on the virtual machine template (105) in a network cordoned sandbox (170), triggering the virtual machine (116) to update per the updated management policy (110), and saving the virtual machine (116) as an updated virtual machine template (106).

15 Claims, 6 Drawing Sheets

(56) References Cited

U.S. PATENT DOCUMENTS

| | | |
|---|---|---|
| 2006/0184935 A1 | 8/2006 | Abels |
| 2007/0250833 A1 | 10/2007 | Araujo, Jr. et al. |
| 2007/0294676 A1 | 12/2007 | Mellor et al. |
| 2008/0134177 A1 | 6/2008 | Fitzgerald et al. |
| 2008/0163171 A1 | 7/2008 | Chess et al. |
| 2008/0256538 A1 | 10/2008 | Carter et al. |
| 2008/0271016 A1 | 10/2008 | Chess et al. |
| 2009/0007105 A1* | 1/2009 | Fries .................. G06F 8/65 718/1 |
| 2009/0031307 A1* | 1/2009 | Chodroff .......... G06F 9/5077 718/100 |
| 2009/0100420 A1 | 4/2009 | Sapuntzakis |
| 2009/0199178 A1* | 8/2009 | Keller ............... G06F 9/455 718/1 |
| 2009/0249472 A1* | 10/2009 | Litvin .............. H04L 63/0263 726/14 |
| 2010/0017512 A1 | 1/2010 | Ciano et al. |
| 2010/0107163 A1 | 4/2010 | Lee |
| 2011/0251992 A1* | 10/2011 | Bethlehem ........ H04L 12/2863 707/610 |
| 2014/0282519 A1* | 9/2014 | Apte ................ G06F 9/45533 718/1 |
| 2015/0046706 A1* | 2/2015 | Makarov ........... G06F 21/6218 713/165 |
| 2016/0055026 A1* | 2/2016 | Fitzgerald .......... G06F 21/51 718/1 |

OTHER PUBLICATIONS

Microsoft Corporation, "Hyper-V Server 2008 R2." http.microsoft.com/hyper-v-server/en/us/default.aspx, retrieved on Apr. 5, 2010 (2 pages).

MS Corporation, Automatically apply Windows Updates to a VM Template, Mar. 4, 2010, 2 pgs. social.technet.microsoft.com/Forums/en-US/virtualmachinemanager/thread/c940b797-0b40-4a2e-87a6-6c6927ba6dd4.

MS Corporation, Offline Virtual Machine Servicing Tool 2.1, Microsoft TechNet, Mar. 4, 2010, 4pgs. technet.microsoft.com/en-us/library/cc501231(printer).aspx.

VMare Communities, "MS Patching in VM Template," Mar. 4, 2010, 6 pgs. communities.vmware.com/message/1201895.

VMware Inc., Virtual Center 2—Templates Usage and Best Practices, White Paper, 2006, 13 pages.

International Search Report & Written Opinion received in PCT Application No. PCT/US2010/034574, dated Feb. 24, 2011, 9 pages.

* cited by examiner

METHODS, APPARATUS AND ARTICLES OF MANUFACTURE TO UPDATE VIRTUAL MACHINE TEMPLATES

BACKGROUND

A virtual machine is an efficient, isolated and virtualized representation of a physical machine. Software executing inside a virtual machine is restricted to the resources and abstractions implemented by the virtual machine. In other words, the software is isolated to and cannot break out of the virtual world defined by the virtual machine. Numerous virtual machines may share underlying physical machine resources, each virtual machine executing its own operating system and/or process(es). In some instances, a software layer called a virtual machine monitor or hypervisor is implemented between the virtual machine(s) and the physical hardware. A hypervisor can run on bare hardware (e.g., as a native virtual machine) or on top of an operating system (e.g., as a hosted virtual machine).

A virtual machine template is an image or file that defines and/or specifies hardware and/or software settings that may be used repeatedly to start, create and/or instantiate a virtual machine pre-configured with those settings. A virtual machine template, as a representation or derivative of a source computing environment, generally includes virtual hardware components, an installed guest operating system (if applicable) and one or more software applications. Virtual machine templates enable information technology organizations to rapidly and/or easily create and deploy new virtual machines and/or virtual servers.

DETAILED DESCRIPTION

When a virtual machine template is created, it enters a quiescent state. In other words, the virtual machine template is an offline and frozen entity that is beyond the reach of traditional management maintenance methodologies. Therefore, any virtual machine started, created and/or instantiated based on, using and/or from a virtual machine template may be out of date with respect to, for example, patches, security updates, security configurations, installed software and/or installed hardware.

Example methods, apparatus and articles of manufacture to update virtual machine templates are disclosed. In disclosed examples, management policies are logically attached to and/or removed from a virtual machine template. Subsequent to a virtual machine being started, created and/or instantiated based on, using and/or from the virtual machine template, the virtual machine is triggered to update its state based on the management policy(-ies) attached to the virtual machine template. In some examples, the virtual machine is started in a network cordoned sandbox that isolates the virtual machine from one or more servers of a network. The virtual machine may be isolated to, for example, prevent out-of-date anti-virus software from potentially exposing other servers to computer viruses and/or to prevent the virtual machine from being exposed to computer viruses. After updating per the attached management policy(-ies), the state of the updated virtual machine is saved as a new and/or updated virtual machine template. Any virtual machines subsequently started based on the updated virtual machine template are compliant with the attached management policy(-ies) when the virtual machines are started.

In other examples, the virtual machine is an operational server and, thus, any virtual machine state changes may be lost when the virtual machine is shut down unless the state of the virtual machine is saved as a new and/or updated virtual machine.

A disclosed example method to update a virtual machine template includes updating a management policy, starting a virtual machine based on the virtual machine template in a network cordoned sandbox, triggering the virtual machine to update per the updated management policy, and saving the virtual machine as an updated virtual machine template.

Another disclosed example method to update a virtual machine template includes receiving a trigger to initiate the update of the virtual machine template, for a first policy of a management policy, determining whether a virtual machine started based on the virtual machine template is compliant with the first policy, when the virtual machine is not compliant with the first policy, updating the virtual machine per the first policy, and saving a state of the virtual machine as an updated virtual machine template, wherein a second virtual machine started based on the updated virtual machine template is in compliance with the management policy.

Figure 1:
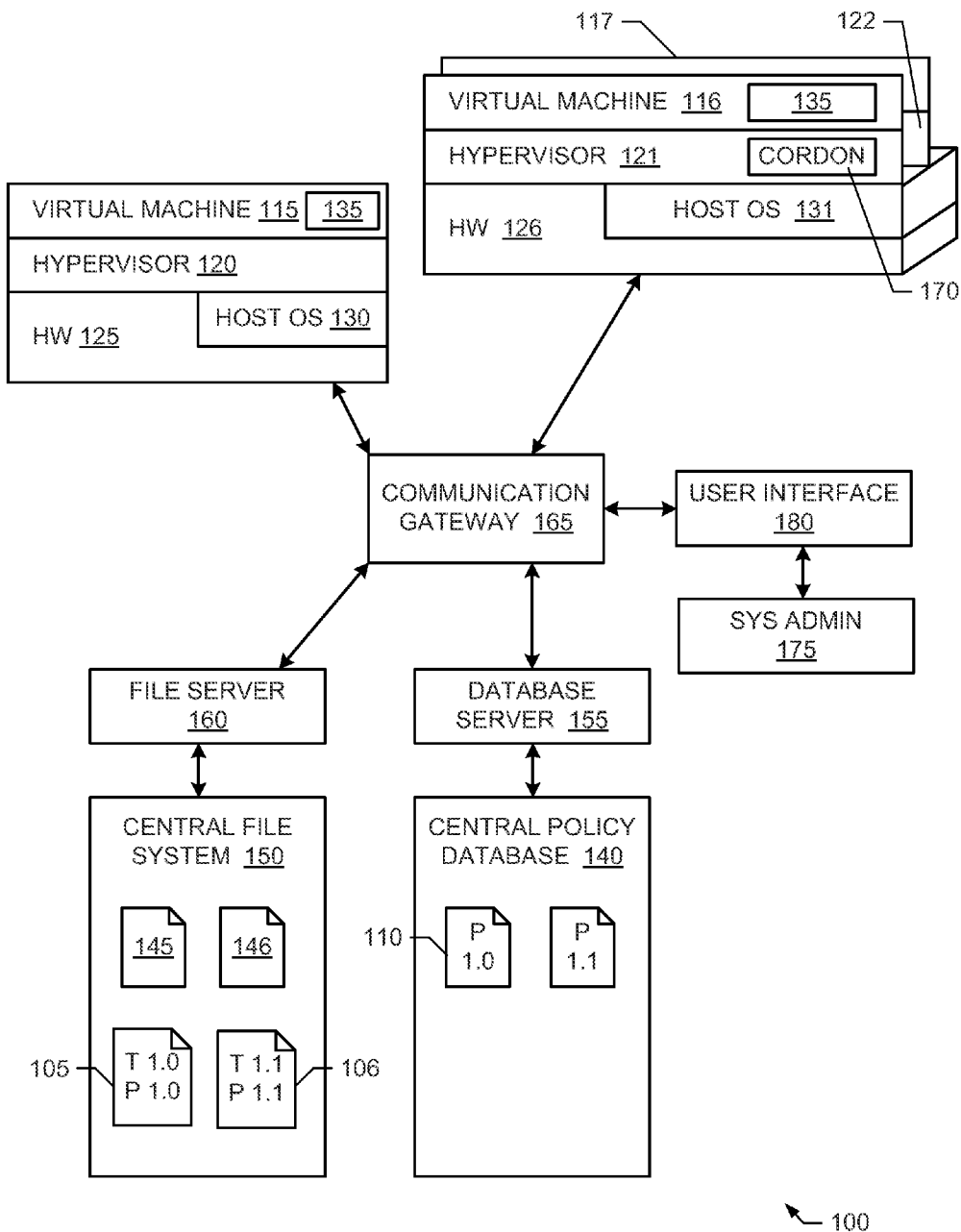
FIG. 1 is a schematic illustration of an example system that is structured to update virtual machine templates.

FIG. 1 illustrates an example system 100 that is structured to update virtual machine templates, one of which is designated at reference numeral 105, based on one or more logically attached and/or associated management policies, one of which is designated at reference numeral 110. Using any number and/or type(s) of method(s) and/or process(es), the example virtual machine template 105 of FIG. 1 may be used to start, create and/or instantiate virtual machines, three of which are designated at reference numerals 115, 116 and 117.

The example virtual machines 115-117 of FIG. 1 execute within environments provided by and/or implemented by respective hypervisors 120, 121 and 122. The example hypervisors 120-122 of FIG. 1 are implemented on top of physical platforms, two of which are designated at reference numeral 125 and 126. In the illustrated example of FIG. 1, host operating systems (OSs) 130 and 131 at least partially intervene between the hypervisors 120-122 and the physical platforms 125, 126. However, in other examples, one or more of the hypervisors 120-122 may execute directly on a physical platform 125, 126 without an intervening host OS 130, 131. As shown in FIG. 1, more than one hypervisor 120-122 and respective virtual machines 115-117 may simultaneously execute on a physical platform 125, 126 and/or host OS 130, 131. Accordingly, the update of multiple and/or different virtual machine templates 105 and/or virtual machines 115-117 may simultaneously be carried out on a physical platform 125, 126. An example processor platform P100 that may be used to implement the example physical platforms 125, 126 is described below in connection with FIG. 6.

To allow the virtual machines 115-117 to be updated based on one or more management policy 110, each of the example virtual machines 115-117 of FIG. 1 implements a server automation (SA) agent 135. The example SA agents 135 of FIG. 1 interact with a central policy database 140 to obtain the one or more management policies 110 that are attached to and/or associated with the template 105 used to start their corresponding virtual machine 115-117. Based on the obtained management policy(-ies) 110, an SA agent 135 obtains one or more files 145, 146 from a central file system 150 that are applied and/or executed to update their associated virtual machine 115-117 in compliance with the obtained management policy(-ies) 110. The files 145, 146 may represent, for example, software patches, software updates, security updates, virus detection updates, firewall updates, security configurations, software, and/or hardware drivers. While not shown in FIG. 1 for clarity of illustration, the example hypervisors 120-122 may also implement SA agents. Example machine-accessible instructions that may be executed by one or more processors to implement the example SA agents 135 are described below in connection with FIG. 5.

As shown in FIG. 1, the example SA agents 135 access the policy database 140 via a database server 155. The example database server 155 of FIG. 1 implements any number and/or type(s) of application programming interface(s), protocol(s) and/or message(s) to enable the SA agents 135, the host OSs 130, 131, and/or the hypervisors 120-122 to query for and/or access the management policies 110 stored in the central policy database 140.

The example SA agents 135 of FIG. 1 access the central file system 150 via a file server 160. The example file server 160 of FIG. 1 implements any number and/or type(s) of application programming interface(s), protocol(s) and/or message(s) to enable the SA agents 135, the host OSs 130, 131, and/or the hypervisors 120-122 to query for and/or access the virtual machine template 105 and/or the files 145 and 146 stored in the central file system 150.

The example SA agents 135, the example host OSs 130, 131, and/or the example hypervisors 120-122 of FIG. 1 communicate with and/or access the database server 155 and/or the file server 160 via any number and/or type(s) of communication gateway(s) and/or network(s), one of which is designated at reference numeral 165.

Example methods, data structures and apparatus that may be used to implement the example central policy database 140, the example database server 155, the example management policies 110, the example central file system 150, the example file server 160, the example communication gateway 165, and/or to update the virtual machines 115-117 based on associated management policies 110 are described in U.S. Pat. No. 7,131,123, issued Oct. 31, 2006, and entitled "Automated Provisioning Of Computing Environments Using a Network Database Model;" and U.S. Pat. No. 6,658,426, issued Dec. 2, 2003, and entitled "Object-Oriented Database Abstraction and Statement Generation," both of which are assigned to Hewlett-Packard Development Company, L.P., the assignee of the present application. U.S. Pat. No. 7,131,123 and U.S. Pat. No. 6,658,426 are each hereby incorporated by reference in its entirety.

To isolate a virtual machine 115-117 from other machines, servers and/or virtual machines, each of the example hypervisors 120-122 of FIG. 1 may implement a network cordon, one of which is designated at reference numeral 170. The example network cordon 170 of FIG. 1 includes any number and/or type(s) of setting(s), parameter(s) and/or value(s) that configure the networking environment implemented by the example hypervisor 121 to limit and/or restrict access by the virtual machine 116 to other machines, servers and/or virtual machines, and/or to limit and/or restrict access of the virtual machine 116 by other machines, servers and/or virtual machines. In other words, the example network cordon 170 enables the example hypervisor 121 of FIG. 1 to create, provide and/or implement a safe sandbox in which a virtual machine template 105 can be updated. The example network cordon 170 configures the hypervisor 121 and/or the virtual machine 116 such that, for example, the only networked resources that the virtual machine 116 can access are the central policy database 140 and the central file system 150 via the communication gateway 165.

To allow a user 175 (e.g., a system administrator) to interact with the example system 100, the example system 100 of FIG. 1 includes a user interface 180. The example user interface 180 of FIG. 1 implements any number and/or type(s) of interfaces (e.g., a web-based graphical user interface) that allow and/or enable the user 175 to access the central file system 150 and the database server 155 to create, configure, update and/or delete virtual machine templates 105 and/or management policies 110, and/or to attach management policies 110 to virtual machine templates 105. The example user interface 180 also enables the user 175 to trigger the update and/or creation of a new virtual machine template 105 based on an updated and/or new management policy 110, and/or to update an already running virtual machine 115-117 based on an updated and/or new management policy 110. The user interface 180 further enables the user 175 to add, delete, modify and/or otherwise manage the files 145 and 146 stored in the central file system 150 via the file server 160. In some examples, the example user interface 180 of FIG. 1 is implemented by a computer or server such as the example processor platform P100 described below in connection with FIG. 6.

While an example system 100 has been illustrated in FIG. 1, one or more of the servers, platforms, interfaces, data structures, elements, processes and/or devices illustrated in FIG. 1 may be combined, divided, re-arranged, omitted, eliminated and/or implemented in any way. Further, the example system 100 may be implemented by hardware, software, firmware and/or any combination of hardware, software and/or firmware. Example hardware includes, but is not limited to, the example processor platform P100, and/or any number and/or type(s) of circuit(s), programmable processor(s), application-specific integrated circuit(s) (ASIC(s)), programmable logic device(s) (PLD(s)), field-programmable logic device(s) (FPLD(s)), and/or field-programmable gate array(s) (FPGA(s)), etc.

When any apparatus claim of this patent is read to cover a purely software and/or firmware implementation, at least one of the example physical platforms 125, 126, the example hypervisors 120-122, the example virtual machines 115-117, the example SA agents 135, and/or the example user interface 180 is hereby expressly defined to include a tangible article of manufacture such as a tangible computer-readable medium storing the firmware and/or software. As used herein, the term tangible computer-readable medium is expressly defined to include any type of computer-readable storage and to exclude propagating signals. Example tangible computer-readable medium include a volatile and/or non-volatile memory, a volatile and/or non-volatile memory device, a compact disc (CD), a digital versatile disc (DVD), a floppy disk, a read-only memory (ROM), a random-access memory (RAM), a programmable ROM (PROM), an electronically-programmable ROM (EPROM), an electronically-erasable PROM (EEPROM), an optical storage disk, an optical storage device, magnetic storage disk, and/or a magnetic storage device, a cache, or any other storage media in which information is stored for any duration (e.g., for extended time periods, permanently, brief instances, for temporarily buffering, and/or for caching of the information). As used herein, the term non-transitory computer-readable medium is expressly defined to include any type of computer-readable medium and to exclude propagating signals. Further still, the example system 100 may include servers, platforms, interfaces, data structures, elements, processes and/or devices instead of, or in addition to, those illustrated in FIG. 1 and/or may include more than one of any or all of the illustrated servers, platforms interfaces, data structures, elements, processes and/or devices.

Figure 2:
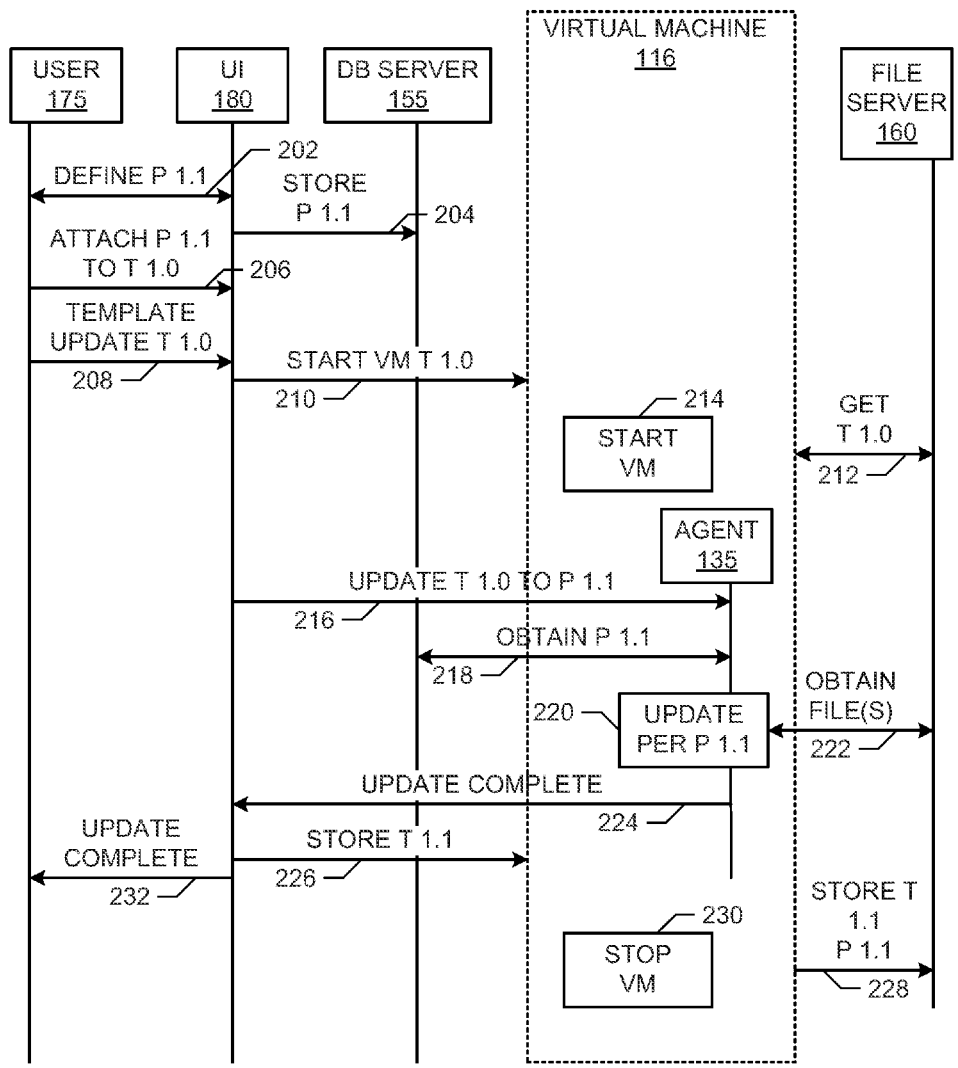
FIGS. 2 and 3 illustrate example interactions and example processes that may be implemented using machine-accessible instructions, which may be executed by, for example, one or more processors, to update virtual machine templates and/or to implement the example system of FIG. 1.
Figure 3:
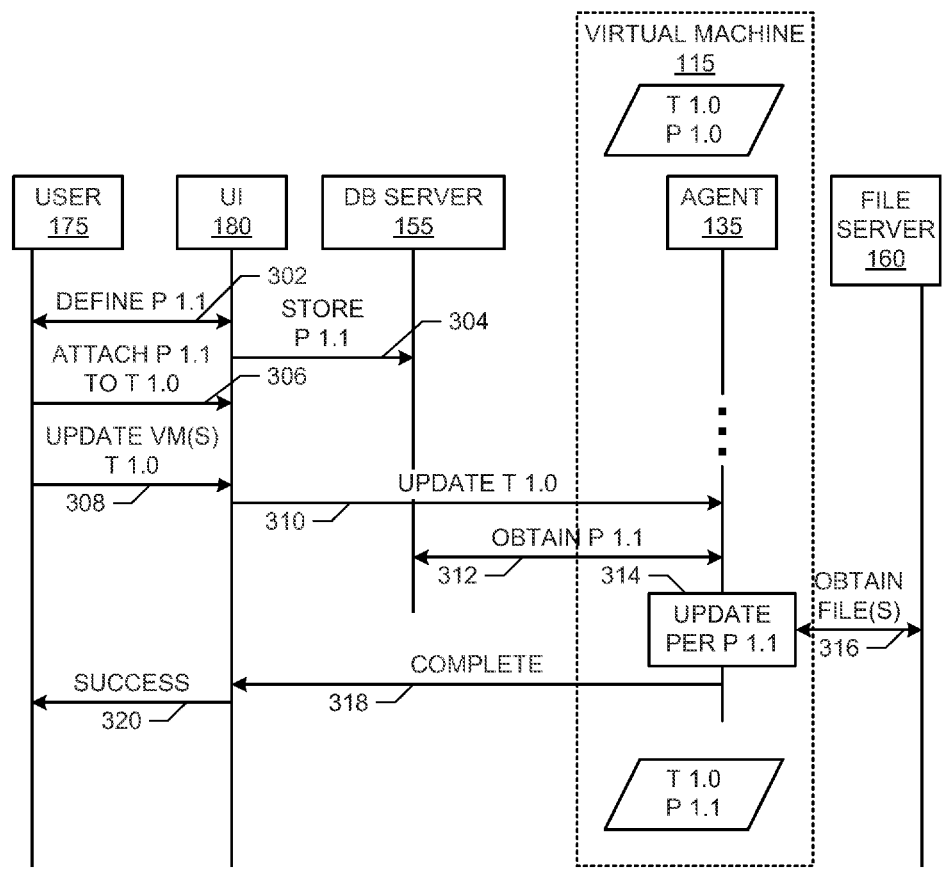
Figure 4:
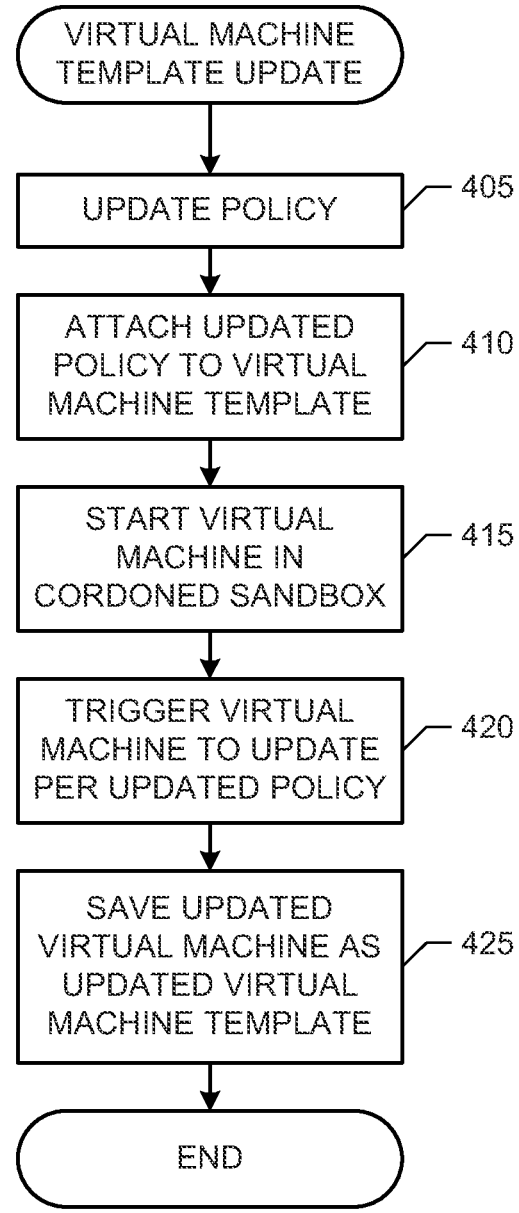
FIG. 4 is representative of an example process that may be implemented using machine-accessible instructions, which may be executed by, for example, one or more processors, to update virtual machine templates and/or to implement the example system of FIG. 1.
Figure 5:
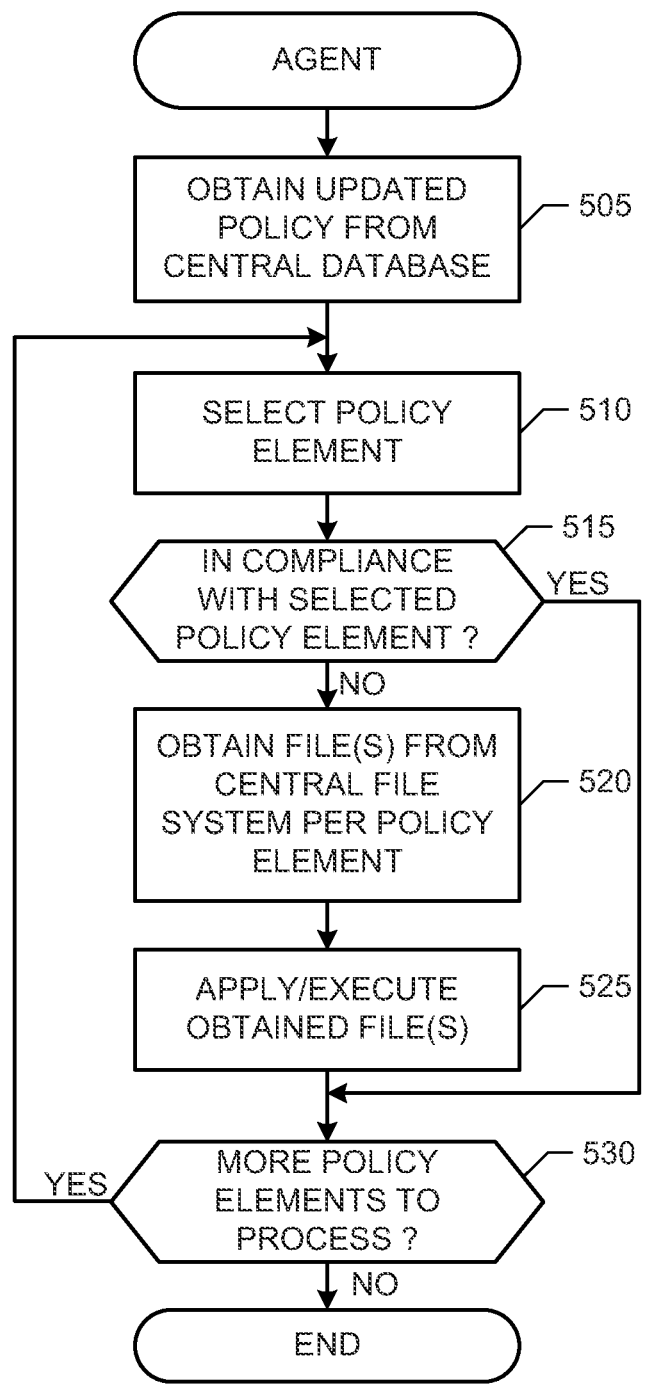
FIG. 5 is representative of an example process that may be implemented using example machine-accessible instructions, which may be executed by, for example, one or more processors, to update a virtual machine per a management policy.

FIGS. 2 and 3 illustrate example interactions and example processes that may be implemented using machine-accessible instructions, which may be carried out to update any of the example virtual machine templates 105 based on attached management policies 110 and/or to implement the example system 100 of FIG. 1. FIG. 4 is representative of an example process that may be implemented using machine-accessible instructions, which may be executed by, for example, one or more processors, to update any of the example virtual machine templates 105. FIG. 5 is representative of an example process that may be implemented using machine-accessible instructions, which may be executed by, for example, one or more processors, to update a virtual machine 115-117 per a management policy 110.

A processor, a controller and/or any other suitable processing device may be used, configured and/or programmed to execute and/or carry out the example interactions, the example processes and/or the example machine-accessible instructions of FIGS. 2-5. For example, the example interactions, the example processes and/or the example machine-accessible instructions of FIGS. 2-5 may be embodied in coded instructions stored on a tangible computer-readable medium that can be used to store program code and/or instructions in the form of machine-readable instructions or data structures, and which can be accessed by a processor, a computer and/or other machine having a processor, such as the example processor platform P100 discussed below in connection with FIG. 6. Machine-readable instructions comprise, for example, instructions and data that cause a processor, a computer and/or a machine have a processor to perform one or more particular processes. Alternatively, some or all of the example the example interactions, the example processes and/or the example machine-accessible instructions of FIGS. 2-5 may be implemented manually or using any hardware, software and/or firmware. Further, many other methods of implementing the examples of FIGS. 2-5 may be employed. For example, the order of execution of the blocks may be changed, and/or one or more of the blocks described may be changed, eliminated, sub-divided, or combined. Additionally, any or all of the example interactions, the example processes and/or the example machine-accessible instructions of FIGS. 2-5 may be carried out sequentially and/or carried out in parallel by, for example, separate processing threads, processors, devices, discrete logic, circuits, etc.

The illustrated example of FIG. 2 begins with the example user 175 interacting 202 with the example user interface 180 to define an updated management policy P 1.1. The example user interface 180 stores 204 the updated management policy P 1.1 in the example policy database 140 via the database server 155.

The user 175 attaches 206 the updated policy P 1.1 to a virtual machine template T 1.0 and directs 208 the user interface 180 to trigger an update of virtual machine template T 1.0 based on the updated and attached policy P 1.1. Alternatively, the updated policy P 1.1 may specify the virtual machine template(s) 105 to which the updated policy P 1.1 is to be automatically attached to by the user interface 180.

The example user interface 180 initiates 210 the instantiation of the example virtual machine 116 based on the virtual machine template T 1.0 using any applicable method(s) and/or process(es). The template T 1.0 is obtained 212 from the file system 150 via the file server 160 and used to start 214 the virtual machine 116. In some examples, the virtual machine 116 will be isolated from at least some networked devices via the example network cordon 170.

After the virtual machine 116 has been started (block 214), the example user interface 180 triggers 216 the example SA agent 135 to update the virtual machine 116 per the attached and updated management policy P 1.1. The example SA agent 135 obtains 218 the updated policy P 1.1 from the policy database 140 via the database server 155. The SA agent 135 updates 220 the virtual machine 116 per the updated management policy P 1.1, obtaining 222 files 145, 146 from the central file system 150 via the file server 160, as necessary.

When the update 220 of the virtual machine 116 is complete, the SA agent 135 notifies 224 the user interface 180 that the update is complete. In some examples, the notification 224 may indicate whether any updates were unable to be applied. When the notification 224 is received, the user interface 180 directs 226 the virtual machine 116 to save its current state as a new virtual machine template T 1.1. The virtual machine 116 creates 228 the new virtual machine template T 1.1 in the file system 150 via the file server 160. In the illustrated example of FIG. 1, the process(es) of creating and/or instantiating the new virtual machine template T 1.1 causes the virtual machine 116 to cease operating and/or to shut down 230. In some examples, the user interface 180 notifies 232 the user 175 that the virtual machine template update has completed. In other examples, the example processes of FIG. 2 operate silently without notices and/or status updates provided to the user 175.

The illustrated example of FIG. 3 begins with the example virtual machine 115 already operational based on a virtual machine template T 1.0 having an attached management policy P 1.0. The example user 175 interacts 302 with the example user interface 180 to define an updated management policy P 1.1. The example user interface 180 stores 304 the updated management policy P 1.1 in the example policy database 140 via the database server 155.

The user 175 attaches 306 the updated policy P 1.1 to the virtual machine template T 1.0 and directs 308 the user interface 180 to trigger an update of the virtual machine 115 based on the updated and attached policy P 1.1. In some examples, the user 175 can select one or more operational virtual machines 115-117 to be updated per the updated policy P 1.1. In other examples, the user can select or identify that any operational virtual machines 115-117 started using one or more particular virtual machine template T 1.0 are updated per the updated policy P 1.1. In still other examples, the updated policy P 1.1 may specify that virtual machines 115-117 started using one or more particular virtual machines templates 105 are to be updated.

The user interface 180 triggers 310 the example SA agent 135 to update the virtual machine 115 per the updated management policy P 1.1. The example SA agent 135 obtains 312 the updated policy P 1.1 from the policy database 140 via the database server 155. The SA agent 135 updates 314 the virtual machine 115 per the updated policy P 1.1, obtaining 316 files 145, 146 from the central file system 150 via the file server 160, as necessary.

When the update 314 of the virtual machine 115 is complete, the SA agent 135 notifies 318 the user interface 180 that the update is complete. In some examples, the notification 318 may indicate whether any updates were unable to be applied. When the virtual machine 115 has been updated, the user interface 180 notifies 320 the user 175 that the virtual machine 115 has been updated. While the example of FIG. 3 includes the example notification 320, in other examples the example processes illustrated in FIG. 3 proceed silently without notices and/or status updates provided to the user 175.

The example process of FIG. 4 begins with the user 175 and/or the user interface 180 updating a management policy 110 (block 405) and attaching the updated policy 110 to a virtual machine template 105 (block 410). A virtual machine 115-117 is started using the virtual machine template 105 in, for example, a network cordoned sandbox (block 415). The virtual machine 115-117 is triggered to and updates per the updated management policy 110 (block 420), and the state of the updated virtual machine 115-117 is saved as a new and/or updated virtual machine template 105 (block 425). Control then exits from the example process of FIG. 4.

The example process of FIG. 5 begins with an SA agent 135 obtaining an updated management policy 110 from the example central policy database 140 via the example database server 155 (block 505). The SA agent 135 selects and/or identifies a first policy element and/or entry in the updated management policy 110 (block 510) and determines whether the virtual machine 115-117 associated with the SA agent 135 is compliant with the policy element and entry (block 515).

If the virtual machine 115-117 is not compliant (block 515), the SA agents 135 obtains via the file server 160 one or more files 145, 146 from the central file system 150 specified by the presently considered policy element (block 520). The obtained file(s) 145, 146 are executed and/or applied to update the virtual machine 115-117 per the policy element (block 525).

If there are more policy elements and/or entries to process (block 530), control returns to block 510 to select the next policy element and/or entry. If there are no more policy elements and/or entries to process (block 530), control exits from the example machine-accessible instructions of FIG. 5.

Returning to block 515, if the virtual machine 115-116 is compliant with the presently considered policy element and/or entry (block 515), control proceeds to block 530 to determine whether there are more policy elements and/or entries to process.

Figure 6:
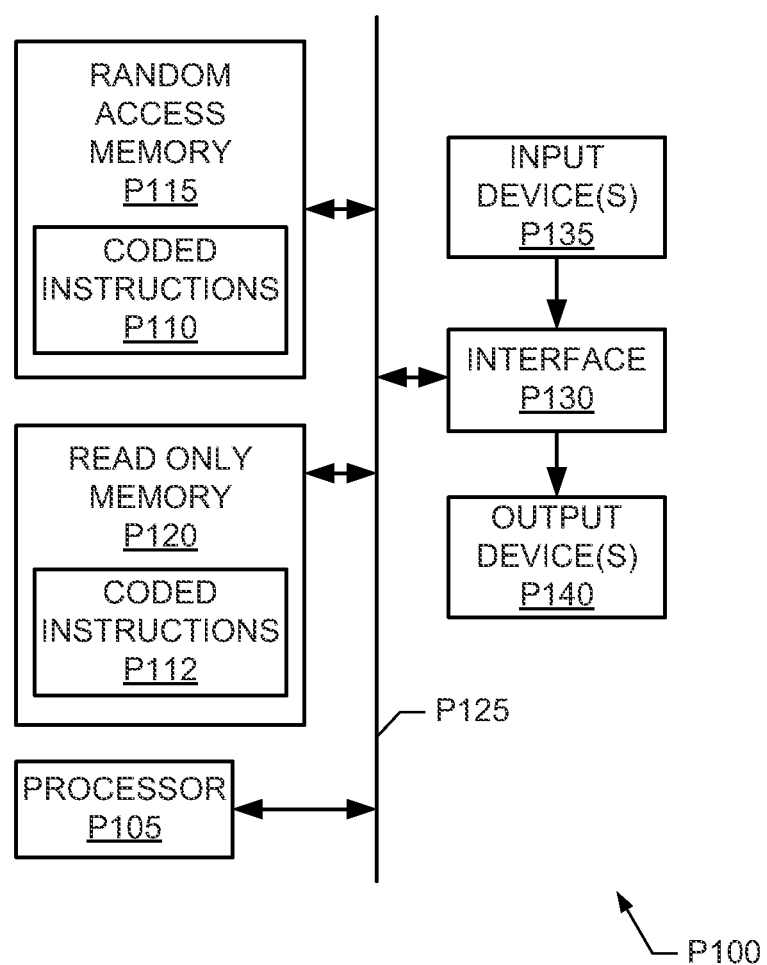
FIG. 6 is a schematic illustration of an example processor platform that may be used and/or programmed to execute the example interactions, the example processes and/or the example machine-accessible instructions of FIGS. 2-5 to implement any or all of the example methods, apparatus and/or articles of manufacture described herein.

FIG. 6 is a schematic diagram of an example processor platform P100 that may be used and/or programmed to execute the interactions and/or the example machine readable instructions of FIGS. 2-5. One or more general-purpose processors, processor cores, microcontrollers, etc may be used to implement the processor platform P100.

The processor platform P100 of FIG. 6 includes at least one programmable processor P105. The processor P105 may implement, for example, the example physical platforms 125, 126 and/or the example user interface 180 of FIG. 1. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example interactions and/or the example machine-accessible instructions of FIGS. 2-5 to update virtual machine templates 105 and/or virtual machines 110, as described herein. Thus, the coded instructions P110, P112 may include the instructions of FIGS. 2-5.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller.

The processor platform P100 also includes an interface circuit P130. Any type of interface standard, such as an external memory interface, serial port, general-purpose input/output, etc, may implement the interface circuit P130. One or more input devices P135 and one or more output devices P140 are connected to the interface circuit P130.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent either literally or under the doctrine of equivalents.

What is claimed is:

1. A method to update a virtual machine template, comprising:
   updating a management policy associated with a virtual machine;
   starting a virtual machine based on the virtual machine template in a network cordoned sandbox, wherein starting the virtual machine in the network cordoned sandbox configures the virtual machine to access a central policy database and a central file system using a communication gateway;
   triggering, based on the management policy updating, the virtual machine to update per the updated management policy, wherein a user interface triggers a server automation (SA) agent to initiate the update;
   saving the virtual machine as an updated virtual machine template, wherein a second virtual machine started based on the updated virtual machine template is in compliance with the management policy;
   for a second policy of the management policy, determining whether the virtual machine started based on the virtual machine template is compliant with the second policy; and
   updating the virtual machine per the second policy when the virtual machine is not compliant with the second policy.

2. A method as defined in claim 1, further comprising storing the updated management policy in a database, wherein the virtual machine obtains the updated management policy from the database.

3. A method as defined in claim 1, further comprising attaching the updated management policy to the virtual machine template.

4. A method as defined in claim 1, further comprising presenting a user interface to enable a user to update the management policy and to trigger the update of the virtual machine per the updated management policy.

5. A method as defined in claim 1, wherein updating the virtual machine per the updated management policy comprising selecting a policy element from the updated management policy and determining whether the virtual machine is compliant with the policy element.

6. The method as defined in claim 1, wherein updating the virtual machine per the updated management policy comprising obtaining a file from the central file system and applying the file to update the virtual machine when the virtual machine is not compliant with a policy element.

7. The method as defined in claim 1, further comprising providing notification to a user at the completion of updating the virtual machine per the updated management policy, wherein the notification comprises updates that were not applied.

8. A method as defined in claim 1, wherein saving the virtual machine as the updated virtual machine template causes the virtual machine to cease operations.

9. A non-transitory computer-readable medium storing machine-readable instructions that, when executed, cause a machine to update a virtual machine template by:
   updating a management policy associated with a virtual machine;
   starting a virtual machine based on the virtual machine template in a network cordoned sandbox, wherein starting the virtual machine in the network cordoned sandbox configures the virtual machine to access a central policy database and a central file system using a communication gateway;
   triggering, based on the management policy updating, the virtual machine to update per the updated management policy, wherein a user interface triggers a server automation (SA) agent to initiate the update;
   saving the virtual machine as an updated virtual machine template, wherein a second virtual machine started based on the updated virtual machine template is in compliance with the management policy;
   for a second policy of the management policy, determining whether the virtual machine started based on the virtual machine template is compliant with the second policy; and
   updating the virtual machine per the second policy when the virtual machine is not compliant with the second policy.

10. A non-transitory computer-readable medium as defined in claim 9, wherein the machine-readable instructions, when executed, cause the machine to attach the updated management policy to the virtual machine template.

11. A non-transitory computer-readable medium as defined in claim 9, wherein the machine-readable instructions, when executed, cause the machine to present a user interface to enable a user to update the management policy and to trigger the update of the virtual machine per the updated management policy.

12. A non-transitory computer-readable medium as defined in claim 9, wherein the machine-readable instructions, when executed, cause the machine to store the updated management policy in a database, wherein the virtual machine obtains the updated management policy from the database.

13. A method to update a virtual machine template, comprising:
   updating a management policy associated with the virtual machine template;
   receiving a trigger, based on the management policy updating, to initiate the update of the virtual machine template, wherein a user interface triggers a server automation (SA) agent to initiate the update;
   for a first policy of the management policy, determining whether a virtual machine started based on the virtual machine template is compliant with the first policy;
   when the virtual machine is not compliant with the first policy, updating the virtual machine per the first policy; and
   saving a state of the virtual machine as an updated virtual machine template, wherein a second virtual machine started based on the updated virtual machine template is in compliance with the management policy;
   starting the virtual machine in a network cordoned sandbox, wherein starting the virtual machine in the network cordoned sandbox configures the virtual machine to access a central policy database and a central file system using a communication gateway;
   for a second policy of the management policy, determining whether the virtual machine started based on the virtual machine template is compliant with the second policy;
   when the virtual machine is not compliant with the second policy, updating the virtual machine per the second policy.

14. A method as defined in claim 13, further comprising obtaining the management policy from the central policy database.

15. A method as defined in claim 13, wherein updating the virtual machine per the first policy comprises:
   obtaining a file identified by the first policy; and
   at least one of applying or executing the file to update the virtual machine.

* * * * *